April 23, 1940.　　　　C. PISTORIUS　　　　2,198,059
PROTECTING DEVICE
Filed March 2, 1938
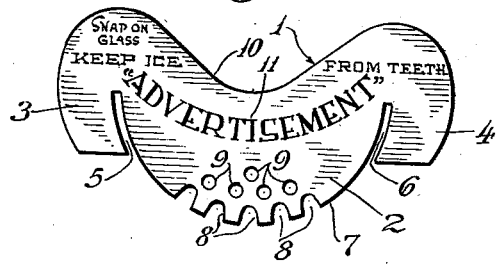
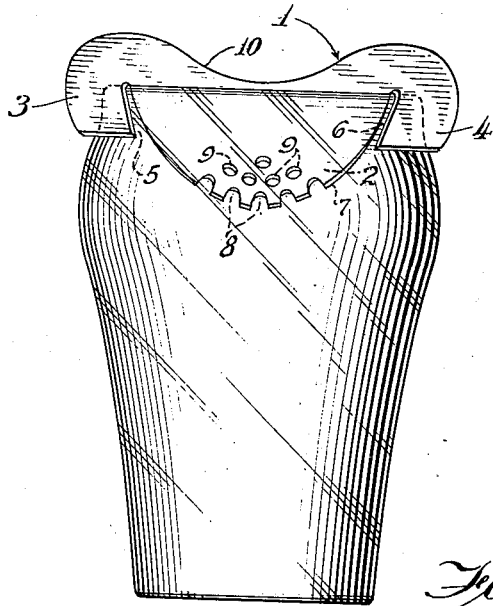
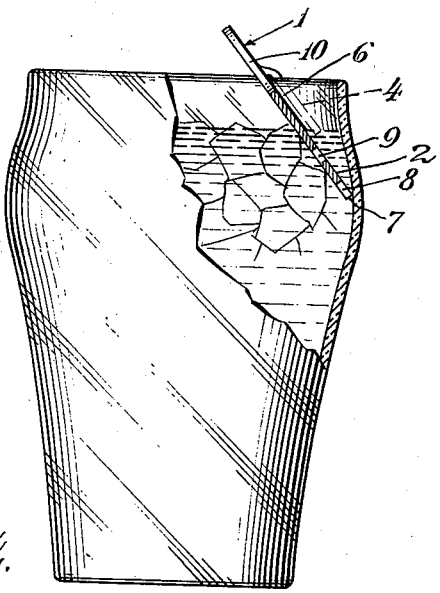
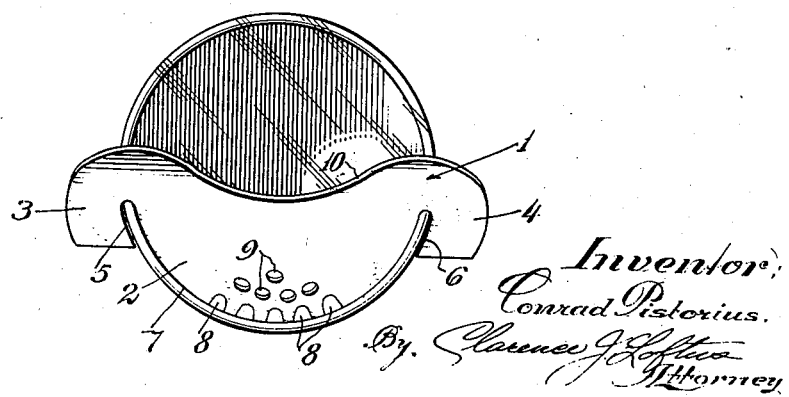
Inventor:
Conrad Pistorius.
By Clarence J. Loftus
Attorney Patented Apr. 23, 1940

2,198,059

UNITED STATES PATENT OFFICE 2,198,059

PROTECTING DEVICE

Conrad Pistorius, Chicago, Ill.

Application March 2, 1938, Serial No. 193,441

2 Claims. (Cl. 210—163)

My invention relates to a protecting device and more particularly to a device for protecting the lips and teeth of one who is drinking an iced drink. It is customary in serving iced drinks, especially in commercial establishments, of mixing cracked ice with the drink. In drinking, the small particles of ice contact the lips and teeth of the drinker causing discomfort and annoyance. My invention comprises a straining device adapted to be placed or snapped onto the glass to strain the liquid content thereof while retaining the ice in the glass out of contact with the drinker.

An object of the invention is to provide such a protecting device of such simple and cheap construction that one may be used with each drink served and then discarded. It is also an object to provide a device adapted to contain an advertising message and thereby create a very effective advertising medium.

Another object is to provide a device so designed, constructed and arranged that, when snapped onto a glass, the lower portion thereof will be urged toward or into contacting engagement with the interior of the glass to provide an effective strainer or filter and prevent ice from accidentally escaping between the device and the side of the glass.

A still further object is to provide a liquid strainer or protecting device comprising a substantially flat sheet of paper, fabric or other suitable inexpensive material, having a contour so formed that when placed over or snapped onto the edge of a glass, the strainer or filter portion automatically assumes an angular position permitting one to freely drink the liquid but filtering or straining out the particles of ice. Furthermore, the position assumed by the strainer is such that one's lips need not touch the device.

Further objects are to provide a construction of maximum simplicity, efficiency, and ease of assembly and operation, and such further objects, advantages and capabilities as will later more fully appear, and as are inherently possessed thereby.

The invention further resides in the combination, construction and arrangements of parts illustrated in the accompanying drawing, and while there is shown therein a preferred embodiment, it is to be understood that the same is susceptible of modification and change, and comprehends other details, arrangements of parts, features and constructions, without departing from the spirit of the invention.

In the drawing:

Fig. 1 is a front view of my novel device.

Fig. 2 is a view in front elevation of a glass equipped with the device.

Fig. 3 is a view, part in side elevation and part in vertical cross section, showing the device in position and straining or preventing ice from entering the space from which the drink is to be taken.

Fig. 4 is a top view of a glass of the type having substantially straight sides equipped with my device.

Referring more particularly to the embodiment disclosed in the drawing, my device as shown generally at 1, comprises a substantially flat and integral sheet of pliable material such as paper, cardboard, fabric or other suitable inexpensive material having a more or less semi-circular or arcuate body portion 2 and integral downwardly extending end or flap portions 3 and 4 with the lower portions thereof separated from the body portion by channels or slots 5 and 6 having the approximate contour of the periphery 7 of the body portion. These slots and the periphery 7 of the device are so curved or arranged that when the device is put on a glass by positioning the slots 5 and 6 over the edges thereof, the contour of the slots will automatically tilt the body portion 2 toward the interior of the glass (see Figs. 3 and 4) and keep the periphery 7 in contact therewith to prevent particles of ice from entering therebetween.

The periphery 7 is provided with serrations or indentations 8 and the body portion with openings or perforations 9 of a size to permit the free passage of the liquid contents of the glass to flow therethrough, but filtering or straining out particles of ice. The top or upper edge of the device is curved downwardly at 10 to provide clearance and prevent it from engaging the upper lip and nose of the drinker.

The paper, fabric or whatever material is employed to form the device, is preferably treated or coated so as to render it liquid-proof as well as sterile. Because of the material used and simplicity of the device, it should be readily apparent that a plurality of the devices may be made in a single stamping operation, and the inexpensive device, when once used, can be discarded and a new device or strainer used for each succeeding drink.

On the front of the device is provided space for an advertisement, as shown at 11, whereby a manufacturer of a soft drink or other commercial establishment may advertise, thus enabling wide use of the device with little, if any, cost to the proprietor. It is also adapted for use in the home, clubs or the like and will furnish an excellent advertising novelty or medium. The novel formation of the slots provides a device which will snap onto and automatically assume the desired position on the glass.

Having thus disclosed my invention,

I claim:

1. In a protecting device for a glass containing an iced drink, a flat integral sheet of thin pliable material which may be discarded after use and having a body portion and projections extending therefrom and in substantially the same plane, slots provided intermediate the projections and the body portion and so arranged and positioned as to receive the edge of the glass and anchor the device in a position to strain or filter the liquid contents of the glass, and openings in the body portion for permitting the passage of the liquid contents therethrough but preventing the passage of ice particles.

2. In a protecting device for a glass containing an iced drink, a sheet of pliable, inexpensive material which may be discarded after use and having an arcuate body portion providing space for an advertising message and overhanging ends in substantially the same plane as and formed integral with said body portion a pair of slots separating the ends from the body portion, said device being adapted to be snapped onto the glass with spaced points of the edge of the glass received in the slots and the contour of the slots being so designed and arranged that the device automatically assumes a position in which the arcuate body portion conformably seats against the interior of the glass for effectively filtering or straining the liquid contents, and openings in the body portion for permitting the passage of the liquid contents therethrough but preventing passage of the ice.

CONRAD PISTORIUS.